United States Patent
Menon et al.

(10) Patent No.: US 7,359,955 B2
(45) Date of Patent: Apr. 15, 2008

(54) METADATA ENABLED PUSH-PULL MODEL FOR EFFICIENT LOW-LATENCY VIDEO-CONTENT DISTRIBUTION OVER A NETWORK

(75) Inventors: Satish N. Menon, Sunnyvale, CA (US); Sanjay S. Singal, Mountain View, CA (US)

(73) Assignee: Kasenna, Inc., Sunnyvale, CA (US)

( * ) Notice: Subject to any disclaimer, the term of this patent is extended or adjusted under 35 U.S.C. 154(b) by 729 days.

(21) Appl. No.: 10/090,709

(22) Filed: Mar. 4, 2002

(65) Prior Publication Data

US 2002/0152318 A1 Oct. 17, 2002

Related U.S. Application Data

(60) Provisional application No. 60/272,939, filed on Mar. 2, 2001, provisional application No. 60/272,944, filed on Mar. 2, 2001.

(51) Int. Cl.
*G06F 15/16* (2006.01)
*G06F 1/12* (2006.01)

(52) U.S. Cl. ............ 709/219; 709/226; 709/231; 709/234

(58) Field of Classification Search ........... 709/219, 709/226, 234, 231, 246–247, 204–207; 710/52; 725/86–100
See application file for complete search history.

(56) References Cited

U.S. PATENT DOCUMENTS

| 5,623,699 | A | * | 4/1997 | Blakeslee | 710/52 |
|---|---|---|---|---|---|
| 5,920,700 | A | | 7/1999 | Gordon et al. | |
| 6,119,167 | A | * | 9/2000 | Boyle et al. | 709/234 |
| 6,134,315 | A | | 10/2000 | Galvin | |
| 6,230,200 | B1 | | 5/2001 | Forecast et al. | |
| 6,553,413 | B1 | * | 4/2003 | Lewin et al. | 709/219 |
| 6,708,213 | B1 | * | 3/2004 | Bommaiah et al. | 709/226 |
| 6,868,452 | B1 | * | 3/2005 | Eager et al. | 709/231 |
| 7,107,606 | B2 | * | 9/2006 | Lee | 725/87 |
| 2002/0010798 | A1 | * | 1/2002 | Ben-Shaul et al. | 709/247 |
| 2003/0115282 | A1 | * | 6/2003 | Rose | 709/214 |

OTHER PUBLICATIONS

Rejaie et al., Multimedia proxy caching mechanism for quality adaptive streaming applications in the Internet, IFOCOM 2000, Nineteenth Annual Joint Conference of the IEEE Computer and Communications Societies, Proceedings IEEE, vol. 2, Mar. 26-30, 2000.*
Sen, et al., "Proxy Prefix Caching For Multimedia Streams," *IEEE*, 1999.

* cited by examiner

*Primary Examiner*—Zarni Maung
(74) *Attorney, Agent, or Firm*—Perkins Coie LLP

(57) ABSTRACT

Method, system, computer program and computer program product for a metadata enabled push-pull model and method for efficient low-latency video-content distribution over a network. Metadata is used as a vehicle and mechanism to enable intelligent decisions to be made on content distribution system operation. Metadata is data that contains information about the actual content, and in some cases, the metadata may also contain portions of the content or a low-resolution preview of the content. Aspects of the invention are directed toward the distribution of metadata throughout the network in a way that facilitates efficient system operation as well as optionally but advantageously providing set of services such as tracking, reporting, personalization, and the like.

21 Claims, 4 Drawing Sheets

METADATA ENABLED PUSH-PULL MODEL FOR EFFICIENT LOW-LATENCY VIDEO-CONTENT DISTRIBUTION OVER A NETWORK

RELATED APPLICATIONS

This application claims the benefit under 35 U.S.C. §119 (e) and/or 35 U.S.C. §120 to U.S. Provisional Patent Application Ser. No. 60/272,939 filed Mar. 02, 2001 and entitled Push Pull Model Making Use of Metadata For Efficient Content Distribution; and U.S. Provisional Patent Application Ser. No. 60/272,944 filed Mar. 02, 2001 and entitled Asset Transfer File Format and Extractor/Parser/Installer For Video Content Distribution; each of which is hereby incorporated by reference.

FIELD OF THE INVENTION

The present invention relates broadly to computer networks and streaming media objects delivered over computer networks. Specifically, the present invention relates to efficient techniques, using metadata associated with content, for making copies of content available at various locations inside multiple computer networks in order to provide better quality of service for delivering streaming media objects.

BACKGROUND

Broadband Internet network infrastructure is developing at rates that exceed even aggressive analysts' predictions. In the consumer market sector, telecommunications, cable and wireless companies have accelerated deployment of broadband capability to the home with xDSL, cable modem or wireless last mile rollouts. In the corporate market sector, broadband infrastructure is already available for desktop computing applications.

Broadband provides a foundation for the use of good quality IP video in Internet applications. Traditionally limited to Intranets or private networks, broadband Internet connectivity is paving the way for video-based applications such as Internet advertising with video, rich media on web pages, video-assisted e-commerce (video catalogs, travel, etc.), event webcasting, personalized information on demand (news, sports, medicine, lectures, movies, and the like), personal video exchanges, and training and corporate communications.

Compared to the low frame-rate, small sized videos or low-resolutions traditionally found on the Internet and delivered on narrowband connections, advances in compression technologies have made reasonable quality video possible at connection rates of 300 Kbits/sec (Kbps) or higher. News stories and lectures with very little motion or action can be sent at lower bit rates of approximately 100 Kbps to 200 Kbps. Video with a lot of movement, like a fashion show, needs a higher bit rate to capture the motion and detail of the scene. For a content provider considering Internet distribution, 300 Kbps could be considered acceptable, and 1 to 1.5 Mbps, excellent. Video catalogues, advertisements, and other commerce-related uses of video require that the product be presented at the highest quality levels possible. Broadband rates of 1.5 Mbps and higher afford 30 frames per second (fps) video with CD quality audio. Content with a lot of movement, such as auto racing, needs even higher bit rate, as high as 3 to 4 Mbps.

As Broadband connections proliferate, demand for better performance has fostered an industry focused on speeding up the delivery of Internet content. The majority of these solutions have centered on smaller objects such as text and images. Video data or objects present problems due to their data size and the requirement to provide them at a particular rate related to the real-time or near-real time play or rendering requirement. Due to its sheer size alone, video is one of the most difficult data types to manage on the Internet or other network environment. A five-minute video clip, encoded and compressed at 1.5 Mbps is 56 Megabytes in size. This compares to the few kilobyte data sizes for typical web pages. The strict video timing requirements impose additional constraints. When a frame or set of frames arrive past their intended presentation time (for example, at greater than the nominal $\frac{1}{30}$ second frame interval in the case of a 30 fps video) the consumer or user experiences jerky playback, dropped frames or segments of the video, or other defects that detract from the viewability of the video and render it essentially useless in a commercial setting. Given these stringent requirements, delivering quality video over broadband is a challenging problem.

While deployment of the broadband infrastructure is an important step in enabling streaming video over the Internet, upgrades to connectivity and bandwidth alone do not assure the delivery of quality video to large audiences with minimal start-up latencies. When video is streamed to the end user via the Internet backbone, video quality is often impacted by problems. When the source of the video is not close enough to the end user, packet losses can severely compromise video quality. Packet losses result from congestion buffering introduced by network switches and routers between the video source and the end user. Current bandwidth costs (satellite and terrestrial) make it impractical to stream high-quality video from a server to the end user on a point-to-point basis. When the video being sent is intended to be at least TV or broadcast quality video, the problems associated with conventional techniques are even more severe.

Existing conventional solutions geared towards improving the performance of accessing web pages containing rich media (typically including static images) are increasingly being used to address the problems with streaming video on the Internet. Currently, there are two classes of solutions that have been employed for improving performance of content distribution on the Internet: (i) particular content delivery network architectures and operational schemes, and (ii) content caching schemes.

For purposes of comparison, we first address a content delivery scheme that does not provide any sort of distributed content delivery from the content source to the content requester. In this type of system and operation, content such as an audio or video object is stored on a single object server only. When a user (perhaps one of millions of users that may make a request for the same object) makes a request for the object, the request is routed to the single object server via whatever set of networks, routers, or other network infrastructural components may be interposed between the user's client computer or other information appliance and the content object source server. The content object source server then sends the requested content back to the requester. For small-sized non-real-time delivery to a limited number of destinations of certain content objects (such as text or small compressed static image files) such direct delivery approach may represent viable operation. However, such an approach does not address system or server scalability or loading problems.

For even a generalized content type, direct delivery without any form of distributed content caching inherently exhibits two problems. First, for content delivery situations of commercial interest, there is simply not enough network bandwidth at the single central content object server to allow the server to receive and/or to respond to the received requests. Second, even if there were sufficient network bandwidth, there may not be sufficient processing resources within the server to provide the requested content, particularly when the content includes a large volume of high quality video. Here the limiting processing resources may be the ability of the server hardware to serve more than a limited number of video streams concurrently, the limitations of the server to access attached storage devices that store the content (e.g. video), or any other local hardware, software, interface, or other structural or operational limitation of the server.

When the content is video, a third major problem or limitation with such direct delivery becomes evident. Contemporary networks are packet switched and there may typically be a number of routers and switches between the central object server and the requesting user. Routers are typically provided with buffers for buffering data (usually in the form of packets) received until it can be forwarded to the next node in the network, however these buffers have limited buffering capacity and in the event that the amount of data received is greater than the amount that can be forwarded or stored until forwarding is possible, such data or packets of data may simply be lost or dropped. For typical web pages, this does not represent a severe problem as the page is simply requested again. However, for a video stream intended to be viewed continuously and in real time, dropping of a packet of video does not provide any recovery mechanism. That segment of video simply cannot be viewed and various schemes may be provided to substitute for that video segment, such as a static freeze of the last available frame, blanking the screen, or other conventional but usually unsatisfactory techniques. usually unsatisfactory techniques.

In this context it is noted that conventional Internet infrastructure, particularly network routers or the input or output buffers within or associated with such routers do not provide any mechanism for recognizing a packet that has a delivery time requirement or for otherwise maintaining data or packet time-base or isochronous delivery. Therefore other mechanisms may be required if this feature is desired or required.

One attempt toward reducing some of the problems associated with direct delivery has been an attempt at general content distribution so as to provide some scalability and to reduce loading problems as compared to the single central server architecture. One such approach has been a content delivery network employing an architecture and operational scheme commonly referred to as Distributed Content Services (DCS). Under DCS, portions of web pages containing large amounts of content such as images are replicated ("pushed" or "push-replicated") onto a number of edge servers deployed in last-mile service provider locations close to the edges of the network, for example as shown in FIG. 1. This content push is a priori in that the data is sent to all or selected edge servers before there is any knowledge that the data will be used or not. It represents one type of edge server caching strategy where content is cached independent of any identified need or request for the content. (An edge server based content pull caching model is described elsewhere in this specification.)

Although this a priori pushing consumes storage space (such as hard disk drive storage) at the edge server, and utilizes network bandwidth over the network between the content original source server (also referred to as the origin server) and the (or each) edge server, these storage and bandwidth burdens are at least acceptable because the typical web pages that are handled are small, again in the kilobyte range and do not have stringent delivery time requirements. By comparison, a 1 hour video that represents information at a rate of 4 mega-bits per second (4 Mbps), would require 14,400 Megabits of storage and the corresponding amount of network bandwidth for each edge server. Thus while a priori pushing may be acceptable for selected web pages comprised of text and one or a few static images, it consumes a lot of storage at the edge servers and uses a lot of network bandwidth capacity independent of whether the video content will ever actually be requested or delivered to a user. The unused and wasted resources represent an actual monetary and opportunity cost to the provider.

When a user requests the content either explicitly (such as by making a selection from a video play list) or implicitly by accessing such a web page or link within a web page, or other content incorporating or making reference to the content, the edge server closer to the user is directed to serve the replicated content to the user. Edge server "closeness" may be defined in a number of ways, such as geographic proximity, available bandwidth, anticipated cost, or according to other rules or policies.

By distributing at least frequently requested content throughout the network, this Distributed Content Services (DCS) approach advantageously avoids moving large files through the network backbone for such frequently used content. Avoiding the backbone can improve performance (since there are fewer hops between a strategically placed edge server and the requester client) and is a more cost-effective and scalable solution. Content delivery networks generally use private satellite and/or terrestrial networks to connect the originating server to the edge servers. This solution has been widely deployed to improve the delivery of small media types such as static images and streaming audio on web pages. Unfortunately, it does not provide an optimum solution for real-time delivery or playback of video and does not address the resource availability, reservation, and management issues.

Another technique used for solving the above problem is the Caching Approach. In the caching approach, distribution of the content to the caching server is delayed until a first request is made, such that when a user first accesses a web page containing particular content (such as text, images, audio, or video), content is served directly ("pushed") from the origin server and is subsequently received by and cached by a caching server. While this may accurately be referred to as a "push" it may also be accurately referred to as a "pull" since the delivery of content from the origin server to the remote caching server is initiated by the caching server as a result of the received request for the particular content. Where the caching server is an edge server, the caching edge server may receive the request directly from the client/user/requester. Where the caching server is not an edge server, the request for the content is indirectly received from the user through the edge server and any intervening network infrastructure and/or agents. Caching servers are placed at strategic points in a network (typically an Internet Service Provider or ISP network) that are closer to the end users. (Edge servers represent one possible type of caching servers; however, caching servers generally need not be at the edges of the network.)

On subsequent access of the same pages by the same or different requestor/user, the cached content is served directly to the end user, as for example illustrated in FIG. 2. Caching systems consist of specialized equipment at the service provider locations that monitor URL requests for web objects. Serving content from cached server can typically reduce Internet backbone traffic by about 50% or more thus reducing bandwidth use associated costs. Serving content from a cache closer to the end user also improves performance for the reasons outlined in the first approach.

Unfortunately, for the later approach that relies on a user request initiated pull from the caching server (such as a caching edge server) to the origin server and the subsequent push of the content to the user through the caching server (such as the caching edge server), there is a latency or delay associated with receipt and delivery of the content. For simple web pages this delay is acceptable even if a second or a few seconds, but is unacceptable for a continuing stream of real-time video intended for immediate and continuous playback to the user. Such known conventional approaches have not provided for any type of network resource reservation or management that would guarantee or even provide reasonable assurances that once a certain initial portion of the video content had been sent to the requester or to the edge server servicing the requester, that the remainder of the video content stream could be sent without dropped packets or perceptible delays in the receipt. Where such timely receipt could not be assured, then it would be necessary to increase the portion sent to the caching edge server prior to initiating transmission to the requesting user or to send the entire video prior to beginning transmission to the requester so that uninterrupted real time playback may be accomplished. This would of course result in much greater, and perhaps unacceptable, delay in receipt by the requesting user.

Another problem associated with this model is a content location problem. Each edge server that receives a request from a user knows that it can get the requested content from the central origin server (assuming that the origin server has the content) so that each edge server requests the content from that origin server. Under this operating model, the edge servers have no information as to which other of the edge servers may have already obtained the content and therefore represent an alternative and perhaps better (lower latency, higher-bandwidth, fewer hops, or the like) or lower cost alternative source.

Furthermore, as the content is only sent to the edge server if and when a request has been made, there is the likelihood of contention either at the origin server or on the network to receive the requested content under certain scenarios. For example, at prime time viewing hours, there may be too many requests for a popular new video movie so that unacceptable delays are encountered or so that the video stream is disrupted after playback has begun. There may be similar problems with video associated with a breaking news story, or otherwise when some event triggers high interest. This problem is not necessarily encountered for the a priori push model described herein elsewhere as the content push can be scheduled when demands for the content may be low and excess bandwidth is available on the network, such as in the middle of the night in the time zone of the local market.

Another problem with both of these approaches (Distributed Content Services or Caching) is that neither of these approaches by itself lend itself to other business decisions that must or at least should be made prior to serving the request to the end user. For example, if a user's request is directed to his or her edge server directly (which is the case with majority of the systems and methods in use today), there is no information available at the edge to indicate whether the user has rightful access to the object. Additionally, such systems and methods do not easily lend themselves to keeping statistics on usage patterns, reporting, or the like.

One of the benefits of the Internet or computer networks is its ability to provide "narrowcasting" —for example, ability to address small groups of users (and single users) in a targeted manner. The promise of narrowcasting is in its ability to provide targeted information to an end user. In the broadcast world (for example, network television), all users tuned to a particular program (for example, the NBA finals) receive the same program, including the same advertisements. In a narrowcasting world, it should be possible for a user in Cincinnati, interested in automobiles to be seeing advertisements from car dealerships in their local area. This would mean that the information about user ("metadata" or "MD") 108 be available at edge server 110 for dynamic content insertion.

In light of these and other considerations, it will be apparent to those workers having ordinary skill in the art that the current systems and methods for content delivery and caching are not optimal for the delivery of certain types of content and especially for high-quality video content such as broadcast quality content. Current content delivery networks ensure guaranteed response times by storing all of the response-time sensitive data at the edges of the network. Users ensure response times by paying for storage costs. The main assumption here is that storage costs are significantly lower than bandwidth costs associated with transporting data over the backbone. The sheer sizes of high-quality, full-frame rate video on broadband networks require a reexamination of the storage vs. bandwidth issue. To illustrate this issue, consider two exemplary emerging applications of broadband video on the Internet: Internet advertising with video content and the delivery of personalized information on demand.

The Internet ad serving businesses have begun to retool to support broadband video in recognition of the potential advantages for video-based ads over traditional text-based and/or static image based banner ads. For video-based ads, quality, both in terms of the size of the video window as well as frame-rates, is very important. Maintaining high quality video imagery as well as smooth playback or rendering is important relative to a perception of quality of goods and services of the advertiser.

The potential storage and bandwidth requirements for such video-based advertising are tremendous. Industry sources report that one particular market leader in the Internet ad serving business (DoubleClick) served about 48 billion impressions in April 2000. Assuming that in a fully deployed system there would be a million distinct ads and assuming that these ads are 30 seconds long video clips digitized at 1.0 Mbps, then these ads represent 375 Gigabytes of storage. On 1000 edge servers, that is 375 terabytes of video data.

With respect to the delivery of personalized information on demand, personalized or customized delivery of information rich in video content (news, sports, entertainment, personal health information, and other types of video-rich content) is a growing application segment on the broadband Internet. A five-minute video segment at 1.0 Mbps amounts to 37.5 megabytes. One such channel of video, which is a 24-hour segment split into 5 minute segments amount to about 10 gigabytes of storage. A hundred such channels amount to 1 terabyte. Such media stored on 1000 edge servers amount to 1 petabyte of storage for one day's worth of video.

For either of these applications as well as for countless others, at least from a hardware cost perspective, it is impractical to store all of the data inside each of the edge server networks. Additionally, floor space is at a premium at central offices and cable head-ends where the servers and storage need to be deployed. An intelligent placement of data based on measured and anticipated usage is certainly more practical.

Storage is not about hardware device or disk (or other storage media) storage space alone. An 18-gigabyte disk drive may be large enough to hold approximately two days of one channel at an edge server. However, disk bandwidth rates (or the amount of data that can be read from a disk in one unit of time), limit the number of users receiving data from the disk simultaneously. To serve more users, the data needs to be replicated on additional disks, multiplying the amount of space required by many times and adding to the storage costs significantly.

There are also content delivery network approach issues. Content delivery systems may typically use dynamic replication techniques within servers in response to increased loading in the networks. Sheer size of high-quality video media makes run-time replication impractical. Loading usually goes hand-in-hand with increased data traffic in the network. Replication in response to loading congests the networks further. Some content delivery networks use satellite transmissions to move data from data sources to edge servers connected to receivers. Satellite transmission is cost-effective if data from a source is broadcast to a number of receivers simultaneously. Live event webcasting therefore is naturally suited to this mode of transmission. Due to storage size requirements outlined above, applications that require on-demand streaming from stored data, where data is not uniformly stored at the edges, cannot be deployed cost-effectively using satellite transport.

With advances in optical networking technologies such as Dense Wavelength Division Multiplexing (DWDM) that add more channels to each fiber of an optic fiber network, terabit backbone capacity is likely moving toward practical implementation and bandwidth costs are likely to get significantly cheaper. However, due at least in part to the isochronous nature of video data, and the number of hops that video data is likely to encounter between a source server and a user computer, it may be impractical to stream video from the source to the user computer directly. This and scalability reasons ensure that edge serving is likely to remain a favored operational and architectural model.

For the various caching approaches, several issues still remain. Networks that use pure caching solutions also suffer from problems due to the sheer size of the objects they are required to cache. For any reasonable size cache, the number of objects that can be cached is fairly small leading to high cache churn and low hit rates. Caching of media reduces the level of control that the content owner (or content distributor) has over their video objects. The loss of control implies tracking and copyright issues that directly impact revenue generation. The loss of tracking ability also reduces the ability to create revenue via targeted advertisement. Finally, as networks increase in size, efficiently locating cached media and directing it to the appropriate edge server becomes a challenge.

Thus, there remains a need for an improved and preferably for an optimal solution for streaming video (or other large time-sensitive data types) over the Internet or other network. The current popular solutions have been designed for delivering static images and streaming audio over the Internet and are unable to meet real-time or at least isochronous streaming video requirements. They also generally fail to provide adequate network resource reservation management for video content.

SUMMARY

Method, system, computer program and computer program produce for a metadata enabled push-pull model and method for efficient low-latency video-content distribution over a network are provided. Metadata is used as a vehicle and mechanism to enable intelligent decisions to be made on content distribution system operation. Metadata is data that contains information about the actual content, and in some cases, the metadata may also contain portions of the content or a low-resolution preview of the content. Aspects of the invention are directed toward the distribution of metadata throughout the network in a way that facilitates efficient system operation as well as optionally but advantageously providing a set of services such as tracking, reporting, personalization, and the like.

In one embodiment, the invention provides a metadata enabled server for distributing a content object to a user over a network in response to a user request, the metadata enabled server including: a computer having a processor and a memory coupled to the processor for executing computer program instructions, and at least one input/output port for receiving and sending communications from external entities; a storage device coupled to the server and storing metadata describing content objects accessible to the server including a location from where a content object is stored and may be directed to the user; and a controller for distributing the content object to the user using the metadata and maintaining isochronous delivery of portions of the content over the network. Method and procedures, system, and computer program for distributing content and controlling distribution of content are also provided.

DETAILED DESCRIPTION OF EMBODIMENTS

The present invention solves the problems described above by providing a media content distribution system in which metadata (MD) is used for efficient media content distribution.

The basic tenet of at least some embodiments of the invention described herein is the use of metadata as a vehicle and mechanism that enables intelligent decisions to be made on system operation. Metadata contains information about the actual content: for example, its physical properties, possible locations of the content represented by the metadata, its usage terms, and the like, and others as described in greater detail elsewhere in this description. In some cases, the metadata may also contain portions of the content ("content prefix") or a low-resolution preview of the content. Aspects of the invention are directed toward the distribution of metadata throughout the network in a way that facilitates efficient system operation as well as optionally but advantageously providing a set of services (tracking, reporting, personalization, and the like) that are not present in the conventional or prior-art systems and methods.

Figure 1:
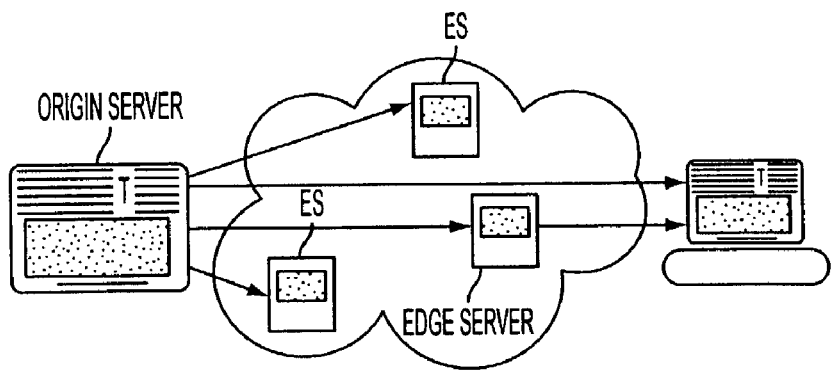
FIG. 1 is an illustration in block diagram form of a prior art system employing an origin server and a network of edge servers.
Figure 2:
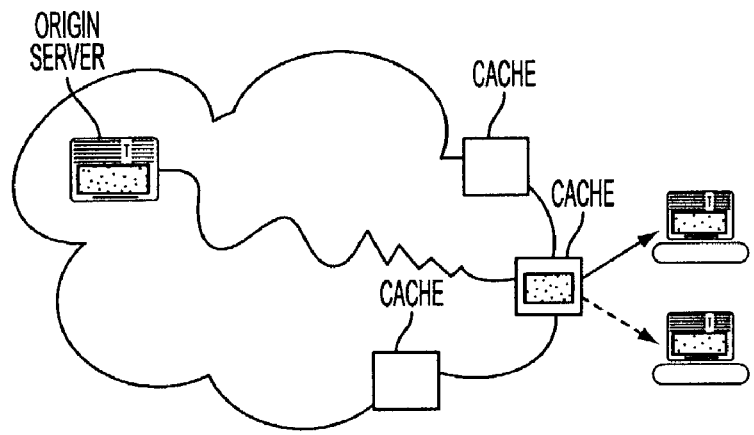
FIG. 2 is an illustration in block diagram form of a prior art system employing a network of caching servers.
Figure 3:
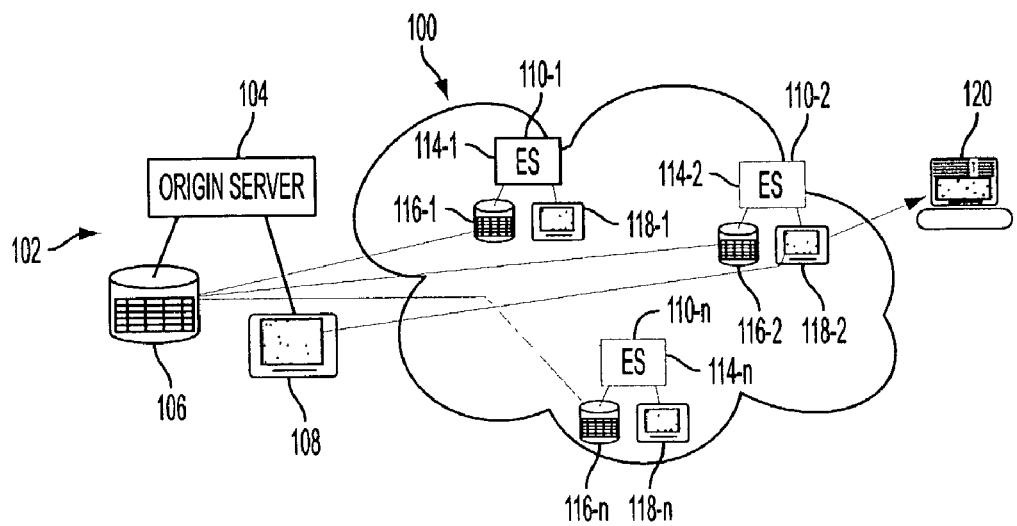
FIG. 3 is an illustration in block diagram form of an embodiment of the system of the present invention as deployed in a global computer network.

With reference to the illustration in FIG. 3, there is shown in block diagram form an embodiment of system 102 of the present invention as deployed in a global computer network. Origin server 104 may be a server of which many types and configurations are known in the art. Typically such servers include a processor, memory coupled to the processor, input/output device, and mass non-volatile storage usually in the form of rotating media hard disk drives, and computer software providing computer executable instructions that execute in the processor and memory to direct the server to operate in a particular manner. In this embodiment, origin server 104 includes a metadata database 106 and video content (or other arbitrary content) store 108. System 102 also includes at least one and typically a plurality of edge servers (ES) 110-n (e.g. 110-1, 110-2, . . . , 110-n) each of which also typically includes metadata database 106 and mass storage 118-n (e.g., 118-1, 118-2 . . . , 118-n). The data stored on each edge server mass storage device 118-n may usually depend on the particular implementation as described in greater detail herein elsewhere. For example, in one embodiment edge server storage 118-n will store full video content once at least a single request has been made for the particular content. In other embodiments, edge server storage 118-n will store prefix content such as a video prefix content portion. In other embodiments, edge server storage 118-n may store both full video content or substantially full video content for a plurality of video titles as well as a prefix portion for some set of video content items. Metadata database 106 and the content may be stored on the same physical and/or logical device or on different physical or logical mass storage devices. As metadata database 106 is relatively small, it may instead or in addition be stored in random access memory, typically with non-volatile backup storage.

Figure 4:
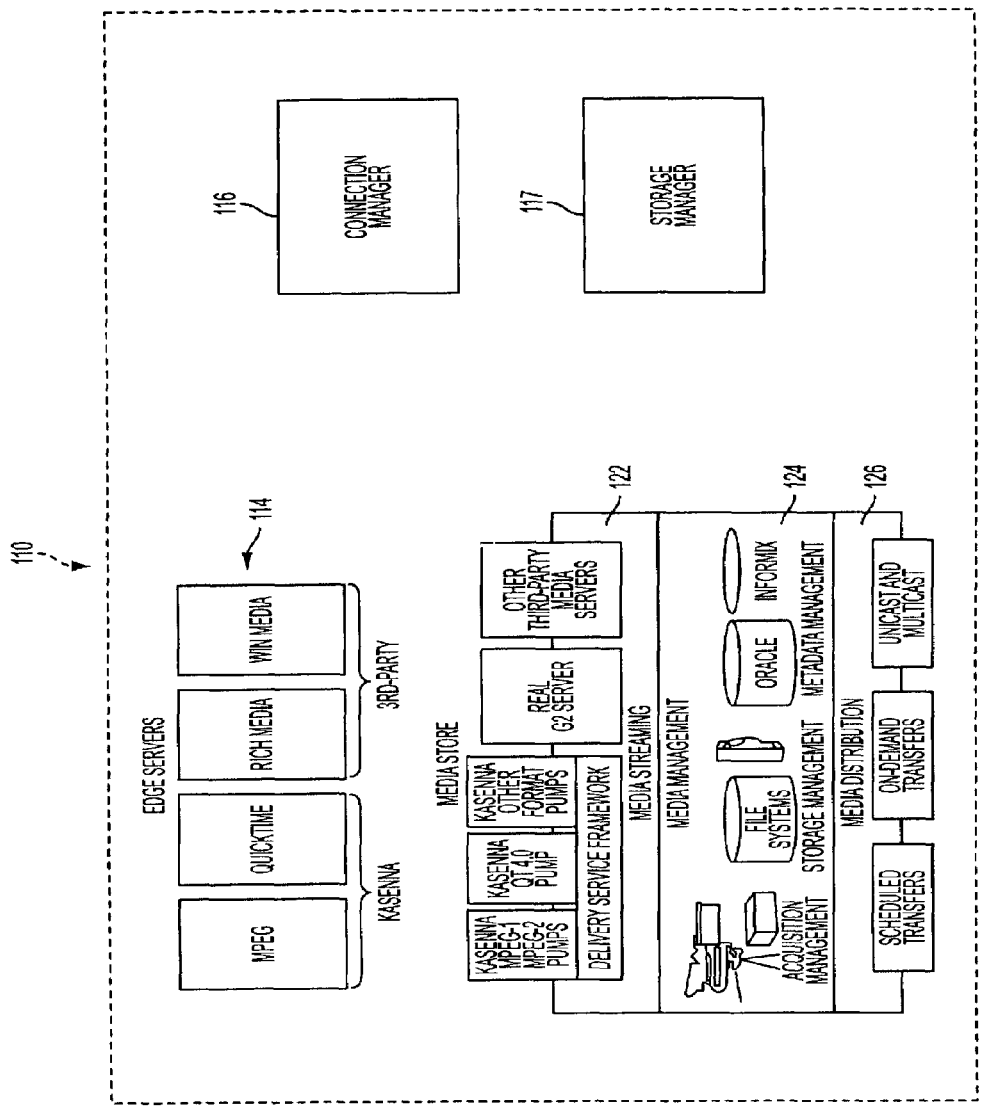
FIG. 4 is an illustration in block diagram form of an embodiment of an edge server executing computer program instructions to implement the inventive content distribution method.

With respect to FIG. 4, there is shown in block diagram form an embodiment of a media store including media streaming support 122 for MPEG-1 and MPEG-2 pumps, Kasenna (Mountain View, Calif.) OT 4.0 format pump, real G2 server, and support for other media service to support a variety of video objects and other content types and formats. Media management 124 functionality is provided, including functionality for acquisition, storage, and metadata database and data management. Media distribution 126 functionality is also provided, including scheduled transfers, on-demand transfers, and uni-cast and multi-cast operation. Connection manager 116 and storage manager 117 functionality may also be provided.

Figure 5:
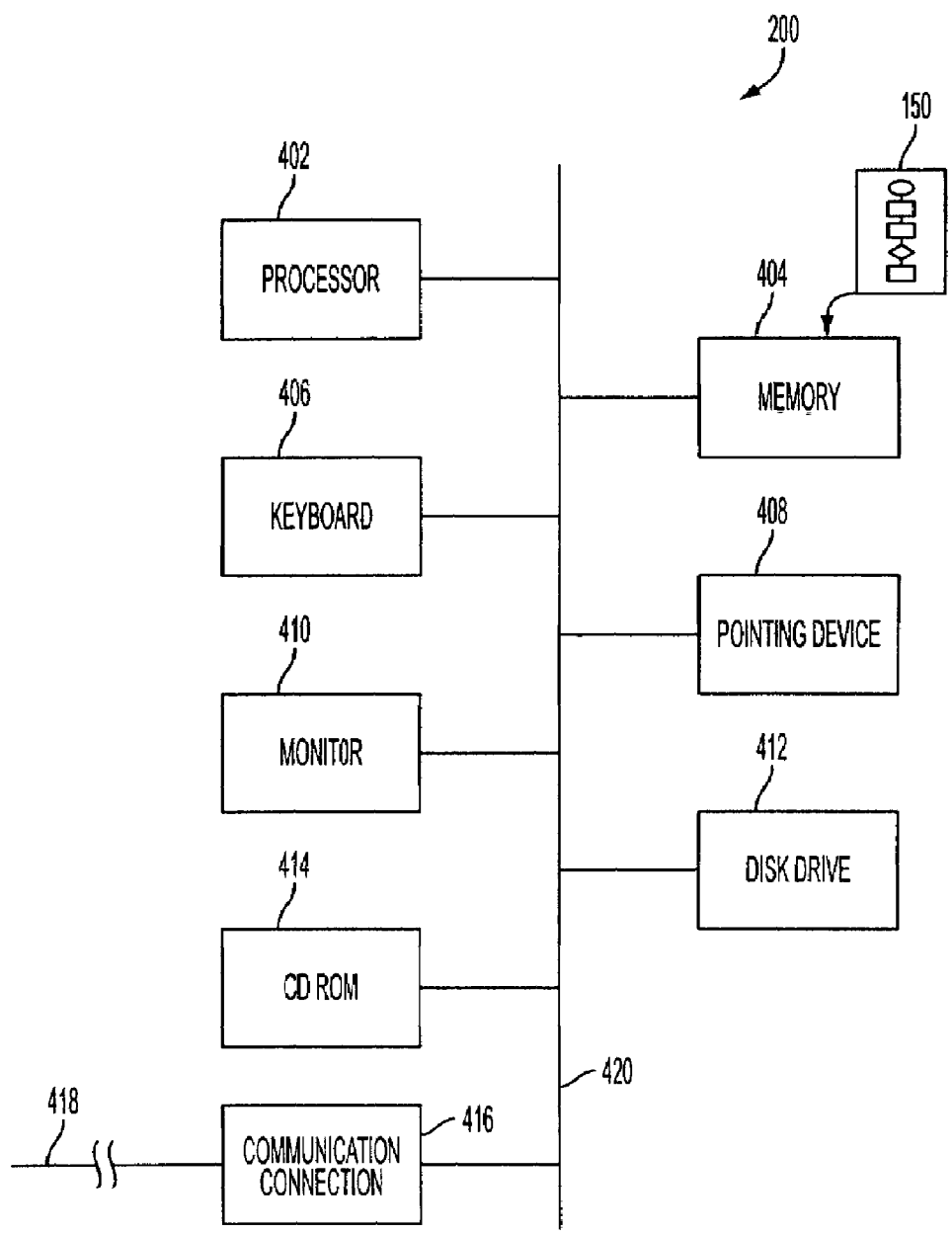
FIG. 5 is an illustration in block diagram form of the major components of a computer as used in conjunction with the system of the present invention.

With respect to FIG. 5, there is shown in block diagram form the major components of a computer as may be used in conjunction with the system of the present invention to receive and render content received. A communication connection provides a communication link or path for receiving content, such as a video content stream, from a server.

By way of a top-level description, in one particular embodiment of the inventive system and method, edge servers or "ES" (that is servers near the edge of the network that are primarily responsible for serving content to end users) on the content distribution network maintain a directory that organizes metadata for individual content items typically in the form of a universal reference locator (URL) for the item. The directory may be part of a relational database in which functions are provided that allow easy manipulation of the metadata, or simpler flat file database structures or lists or tables may be utilized.

In one embodiment, video content URLs, which reference the location of the video objects or assets, regardless of the type of media format they represent, are mapped in a homogeneous format. User selection of particular video content whether by URL or by other designator or identifier may be recorded in the metadata database, regardless of whether the video object is cached or not. Tracking, reporting, billing, targeted advertising, and other data collection and mining operations, are easily enabled using this approach.

In another exemplary application, a web site referenced by a URL may include a server that stores a number of feature length videos (for example it may store 50 feature length movies), available on demand for users that pay a fee to receive streaming video that plays the movie. For each movie on the server, there may be provided a corresponding entry or series of entries in the metadata directory that indicate how many simultaneous plays the host server (such as the origin server or an edge server) can support, how many users are currently viewing copies of the movie or other video or content item, how many copies are available for viewing, bandwidth requirements, and the like. The metadata or metadata database (MD) for this server can be stored on the server itself, as well as exported to other servers in periodic or "on-demand" updates, initiated by the host server or other edge servers in the content distribution network.

Metadata can also be used to locate video objects or other content items. For example, when a user makes a selection (such as by identifying a URL) for a video on an edge server (ES), the metadata (MD) corresponding to the selected URL is examined to see if the corresponding video object is in the cache. If the object is in the cache, the media is streamed directly from the cache. Otherwise, location information in the metadata is used to locate an available server that has the video object in its cache. This location can be based on proximity (number of hops), least traffic load, or other appropriate manner in which transmission time can be minimized and network resources utilized efficiently. Once the video object is found, it is moved directly from its source to the edge server that requested it, avoiding percolating the media through cache hierarchies and incurring delays. By employing hint based algorithms for locating objects, embodiments of the present invention significantly outperform traditional multilevel cache hierarchies.

In another aspect, video prefix caching or video prefix content distribution (VPCD) may be employed in a manner that involves distributing metadata and beginning portions of a video object to edge servers based on characteristics such as anticipated demand, measured usage, and type of connection between origin server (OS) 104 and edge server (ES) 110. For example, large video prefixes can be used for edge servers in which greater demand is anticipated, and smaller prefixes stored on other edge servers. If a hit occurs for a video object having a prefix on the edge server, streaming can begin upon demand, while the remaining portion of the video object is fetched and cached. Typically, origin server 104 will provide a video content store (VCS) 108 or other type of content store, storing the video or other content item for all of the content items. Each edge server 110 may also provide a video or other content store for storing content items, though each edge server's content store will typically store only a subset of the content items stored in the origin server's content store. (It may be noted that certain embodiments of the invention described hereinafter in the context of virtualization may not require a content store 108 or will require a much smaller one used, that may for example, be used to buffer the incoming video prior to transmitting it to the requesting user.)

Using Video Prefix Content Distribution (VPCD), initial latencies involved in copying video data from a source server to an edge server can be practically eliminated. The main principle behind VPCD is the distribution of metadata and beginning portions ("prefix") of video content to the edges based on characteristics such as anticipated demand, measured usage and the type of connection between the origin server and the edge server. For example 10, 20, . . . 100% of the video content may be replicated ("pushed") at the edge servers based on anticipated demand and service-level agreements. If a hit occurs for a video with prefix-content, streaming starts right away, while the rest of the content is fetched in parallel ("pipelined") and cached. This reduces the a priori storage space requirements while eliminating latencies of initial access. When cache is recycled, portions of content are retained along with metadata.

In embodiments of the invention that provide for prefix caching or storage, the video content that is stored in the origin server video content store and delivered to the edge servers in response to a request may be the full length of the video or the full length of the video minus some initial portion corresponding to the video content prefix portion. As the amount of video content prefix may vary from time to time and from network portion to network portion, it may generally be desirable to store the full length video content so that an appropriate portion (possibly with overlap) may always be available at any edge server to send to any other edge server even though some edge servers may or may not implement prefix caching and even though those that do implement prefix caching may cache different amounts or time lengths of content.

When received by a requesting user, the content is rendered or played on a user content rendering or playback device 120, such as a computer, television, set-top box, or other device or system adapted to receive the content stream (video). Alternatively, the content may be stored for later playback or rendering.

Having described some top-level features and advantages of elements of the inventive system and method, attention is now directed to a more detailed description of the embodiments of the inventive system, method, computer program and computer program product, and operating model and method. It is noted that aspects of this invention apply to a large class of content objects, and has particular applicability to multi-media objects which include video and audio components. References with this description relative to video, video objects, video content, and other similar terms may be interpreted to mean all forms of conventional video, movies, cartoons, animations, all forms of time sequenced imagery, and the like, and independent of whether including an audio component or track or not.

Metadata, the defining data that provides information about or documentation of other data managed within an application or environment (or more simply data about other data), is used to identify, describe, locate, fetch, and cache video objects for streaming to users from the edge servers. Various embodiments or sets of metadata may be used in conjunction with different embodiments of the inventive system and the properties and capabilities desired for the system and method.

For example, the metadata may identify and describe the video object or asset, such as its physical characteristics (formats, size, bit rate, or the like physical or logical characteristics), and the location or locations of the actual video objects content on the network from where it may be accessed, transferred, and/or served. Usually one of the locations will be the origin server and according to particular embodiments of the invention, one and typically a plurality of edge servers. (Note that in at least one embodiment of the invention that incorporates prefix caching, only portions of the entire video may be present at certain locations and that in such embodiments the meta data may also or alternatively identify servers where the prefix portion of the full video is stored or cached.)

The metadata may also provide information regarding ownership and/or access rights associated with the content, as well as "time-to-live" or expiration attributes such as may be required when a video object has been purchased for distribution over only a limited defined period of time, such as when a limited term license has been obtained for copyrighted material. Rights information may for example provide an indicator identifying either when, where, and/or to whom the content may be delivered (or when, where, and/or to whom delivery is prohibited). This permission or prohibition may also or alternatively for example be associated with the geographic or nation state location of the edge server, particular domains, be in the form of a list or database, or according to other rules or policies. One example, would prohibit particular sexually explicit video material from being sent to nation states or countries to which such material is offensive or prohibited. Politically sensitive material may be prohibited from being sent to other regions.

The metadata may also define or specify the "cost" associated with providing the content from a first (source) location on a network to another second location on the network, the second location usually being the edge or other server that will serve the content to the requestor. Where separate networks are involved, the cost may include the cost of crossing over from one network to the other. Cost factors, may for example include one or more of tariffs for use of network bandwidth, cost of storage on particular locations of data storage devices, requirements to use external entities or avoid use of external entities, as well as other factors associated with transport and/or storage. Because the cost associated with content retrieval and transport from location to location may change according to network conditions or other factors, an external agent having access to network conditions, network tariffs, contractual information, current bidding forms, or other facts that would influence cost and suggest alternative locations and/or network routings may be employed.

Quality of service (QOS) requirements may also be specified in the metadata. QOS information would identify particular levels of content (e.g. video) quality that must be assured for the material to be served, selected for example from frame format or video quality, playback rate deviations permitted, and other Internet type quality of service criteria as are known in the art.

In other embodiments, the metadata may also provide individual frames from the video, shorter full resolution segments of the video, low resolution renditions of the video, or other forms of imagery derived from or relating to the video itself, such as may be useful or entertaining to the user either in enjoying the full video or making a selection to watch the video. The metadata may also provide documentary information, such as textual information about the video. In some instances such metadata may be rendered to the user during any short delay associated with receiving the video or other content once the request has been made.

In embodiments of the invention providing or supporting content prefix caching (described in greater detail below), the content prefix (such as video prefix) that is an initial smaller portion or subset of the larger content may be provided as an element or component of the metadata. In other embodiments, such content prefix may be provided separately.

In at least one embodiment the metadata consists of (i) a globally unique identifier that identifies and optionally describes the content associated with the metadata, and (ii) a location or locations at which the content may be found, usually in the form of at least the origin server identifier and more typically also the identities of edge servers that cache the content. Other metadata elements may optionally but advantageously be provided to support other desirable content distribution features. By way of highlight and summary, these other optional metadata elements may be selected in any combination from the set: (iii) cost of retrieving the content from each location; (iv) content format such as MPEG version, Real Video, or other known or to be developed audio and/or video formats; (v) rights information; (vi) time-to-live or expiration information; (vii) quality-of-service; (viii) content subset of preview derivative; such as single frame video, low-resolution video, limited length video, textual description, or the like; and/or (ix) content prefix such as defined time duration of actual full video. The invention further contemplates that the metadata may include any other data or information that describes the content, assists in its localization or routing to a requestor, controls access to the content, assists in maintaining a desired level of quality, or otherwise reduces per server or total storage requirements, or reduces latency.

The present invention advantageously provides separation of the metadata path (control plane) from the data path (data plane). System operation includes two primary aspects: (i) content playback or serving, and (ii) system administration which provides for one or more of loading, creating or adding, updating or modifying, and deleting metadata and content. Advantageously, the content and the metadata associated with the content (or portions of the metadata) may be loaded or updated separately. For example, a change in content rights may be made without any need for updating the contents itself, the metadata having a globally unique identifier (or at least unique within the system) that identifies it to the content which also provides an identifier in such a manner that the content data and its metadata are identified to each other.

Metadata is distributed throughout the network and portions of the metadata are stored in servers that receive metadata updates. Since typical metadata for any particular video are orders of magnitude smaller than the video data files themselves, distribution of metadata in the network and storage at the edge servers (or even at clients directly) is a viable operation and does not significantly impact edge servers storage.

In the event that the system is configured to provide different formats of the same content, then such format variations may be identified in the data structure of the metadata database, or where provided in the data structure of a separate directory server, so that the most appropriate format may be selected to satisfy the request. The data structure may be a simple list, a table, a hash, a relational database, or other data structures as are known in the art.

The directory server may typically be a different machine than the origin server or the edge server, but other embodiments may provide the directory on the same machine as the origin or edge servers. One or a plurality of directories or directory servers may be provided according to any of these configurations. A plurality of directory servers are advantageously provided to provide redundancy and reduce loading on any particular server during peak loads.

Figure 6:
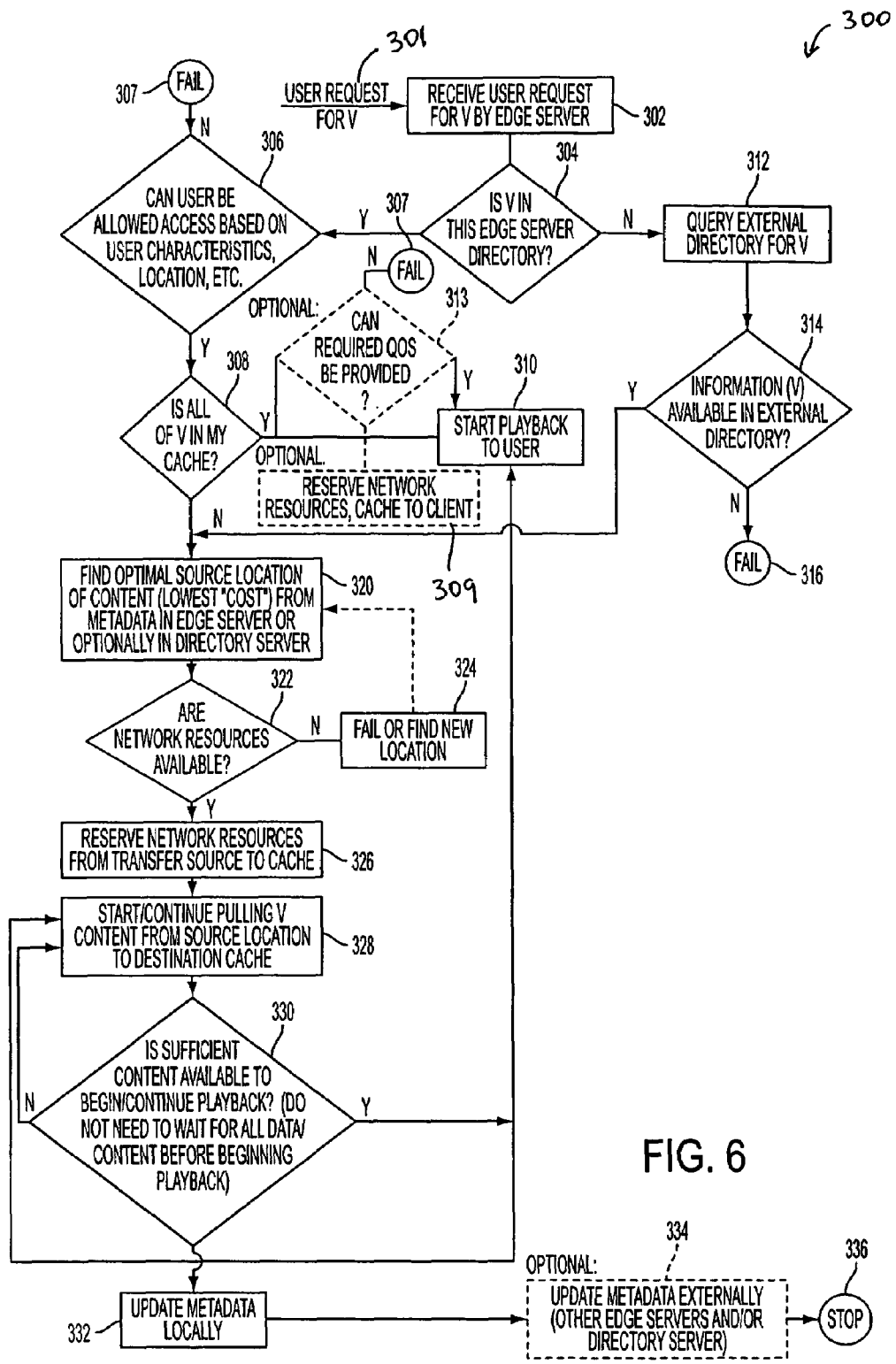
FIG. 6 is a diagrammatic flow chart illustration of an embodiment of a procedure for delivering video content to a requesting user.

Attention is now directed to an embodiment of a procedure for installing content data and metadata associated with the content data on the system, network, and/or components thereof. This procedure is described relative to the diagrammatic flow chart illustration in FIG. 6. First, it is necessary to install, generate, or otherwise place the content (video) into the system and if not initially installed onto the origin server then install onto the origin server using known techniques.

Next, create the metadata for the content. This metadata creation may be done at any time including before, during, or after the content (video) is created so long as the content is sufficiently well defined to permit generation of the metadata for the content. The metadata at this stage may include only the globally unique ID and an origin server location identifier. The origin server location is identified in the metadata even though the video may not actually have been installed on the origin server at that time because it will have been installed there by the time the metadata is actually used or queried. The metadata may subsequently be modified or updated to reflect changes in content storage location.

Supplemental metadata elements may optionally be added as required or desired to provide optional features, capabilities, and performance. For example, the metadata may be augmented with other than a minimum set of elements to identify rights, format, or other of the characteristics of the content as described herein above. This additional metadata may optionally be packaged with or attached to the content and extracted from the content thereby eliminating any manual or separate upload/download steps. The metadata may alternatively be manually entered such as from a text form, uploaded or downloaded from an external source, or automatically be extracted from some file, such as the content data file or any other file. For example, for video content in the MPEG-7 format, metadata may be included with the file and extracted from it.

A push, and desirably a "scheduled push", of the metadata to the edge servers is performed. In one embodiment, the metadata is pushed to all edge servers. In another embodiment, the metadata is pushed to a selected subset of edge servers. Note that the full content (typically Megabytes or Gigabytes) is not being pushed to the edge servers, only the metadata (typically hundreds or a few thousands of bytes) is being pushed and represents orders of magnitude less data than the content itself for most video content of interest here. A scheduled push is a push performed according to a specific schedule or schedule policies and is usually designed to minimize cost and/or disruption to other network activity. Conveniently it may be performed during non-peak hours (overnight) and coordinated in time over the system so that the push is not attempted to all edge servers simultaneously but spread out over time to reduce peak bandwidth needs and server or other network node loading.

Where it is optionally but desired to provide derivative versions of the content, such as low resolution and/or short video clips, or to provide a content prefix portion, these may also be pushed to the edge servers as part of the metadata or otherwise. Embodiments of particular systems, methods, and computer program for performing prefix caching are described in greater detail below and in co-pending U.S. Utility patent application Ser. No. 09/774,204 filed Jan. 29, 2001 and entitled Prefix Caching For Media Objects and assigned to the assignee of the present invention, herein incorporated by reference.

In another optional embodiment, when the system and method provides or utilizes one or more servers other than the origin server and the edge server, such as one or more directory servers, the content metadata may also be pushed to the directory server. This configuration is optionally provided as an optimization of the basic system and method and provides a single location data structure that may be queried to identify all locations at which a content item is located. Directory servers may be replicated at a plurality of locations throughout the network.

The metadata is installed on the system. (It is noted that metadata may be installed and/or updated on the system without reinstalling the video or other content.) Once the scheduled push has been performed, the metadata is updated to reflect the additional content and metadata changes.

After both the content and the metadata have been placed on the system, the system is operational relative to these changes. Until the metadata has been updated to reflect changes at a particular server, these remote locations may be unaware of the new content or the locations of the new content or both; however, the system remains operational.

It is noted that this hybrid "push" and "pull" with metadata based method and system have many advantages over conventional systems and techniques. In a conventional pull method, there is no metadata and no tracking capability is available as to content. In the system described here, metadata data records contain fields to track a variety of characteristics and parameters, for example embodiments of the invention may provide for metadata records containing fields to track one or a combination of: the number of users that accessed the content, the number of users that were denied access to the content, the frequency of access, the length of viewing, or the like. Such information can then be used for data mining purposes: for example, if the frequency of access of a particular content goes over a preset threshold, the system can trigger an operation that eventually results in the "push" of the content from an origin server (or any other server) to the rest of the edge servers (or to some sub-set of the rest of the edge servers). The collected metadata is sent back to an origin server or any other server, either in real-time or packaged and sent periodically or according to any other desired schedule. This optional tracking capability stores user access data (possibly individual user data but more typically statistical data in the interests of maintaining user privacy) in metadata records on the edge server, or in any external location designated for gathering, collection, and/or analysis of the user access data. Typically, the user access data would be gathered at each of the edge servers, and might include by way of example but not limitation, the number of requestor's for each content item, the time of day that the request was made, the delay period between the request and the satisfaction of the request with playback, the sufficiency or excess of context prefix information, the frequency of user disconnects prior to the content being delivered, ratings information or information from which ratings information may be derived, frequently requested content items, items in the directory that are infrequently requested, and any other information that may assist in tuning the network configuration and content delivery, selecting content and content formats, or otherwise tuning or optimizing performance. This collected user access and performance data (a type of metadata in itself) is advantageously stored and pushed back to a processing location for analysis and reporting. The analysis may include various data mining techniques, statistical analysis, or other tuning and/or optimization techniques.

As a result of the collection, tracking, and analysis a decision may be made for example to modify the length of the cached content prefix, such as by shortening or lengthening the prefix. Alternatively or in addition, a decision may be made to push (push now or scheduled push) an entire content item (such as a complete video) for one or a selected plurality of content items. This may occur for example, when based on certain trends in other regions (such as a large number of requests for a particular content item in an eastern time zone region or market) that the same content item will be requested in the same time slot in a pacific time zone region or market. This type of trend based push may be referred to as regional push now and would alleviate the need to later pull a content item into edge servers in that region when for example bandwidth may be more expensive or not so readily available. Quality of service may clearly be maintained at higher levels using this approach.

The key point is that the system and method permit this user and system performance data to be collected, mined, and analyzed in a variety of ways and used to modify, tune, and improve or optimize performance and reduce operational costs. Some of these same techniques and informational elements may also be used for content and delivery personalization based on some user characteristic that are either input into the system (such as via a user registration or questionnaire) or derived by the system such as time zone of user requestor, computer or network access characteristics, prior selection history, network identifier, or other parameters derivable from the edge server.

Several embodiments have been described in which the origin server includes very large volume storage capability so that all or substantially all of the content is at least available on the origin server. These and other embodiments have also provided for content to be cached to the edge server after the first request for the particular content. In such cases, the edge server also needs to have relatively high storage capacity to handle all of the content download or playback requests made by users.

For networks having sufficiently high bandwidth and availability communication channel links or pipes between the origin server and the edge server, a further embodiment eliminates or substantially eliminates local content storage or caching of complete content items (e.g. full videos) on the edge servers. Rather, once a user request is made to an edge server, the edge server pulls the requested content from the origin server and initiates playback to the requesting user once a sufficient quantity of the requested content has been received. The network is configured in such a manner that resources are available for such real-time delivery with some predetermined or specified probability. Optionally, but desirably a initial or prefix portion of each content item is cached so that playback to the requesting user can begin with little or no delay. The length or playback duration of the prefix may be adjusted according to measured and/or predicted delay associated with a content request by a particular edge server to a content source such as the origin server or other content servers or cache servers that may be distributed in the network.

It will be appreciated that embodiments of the invention are designed to interoperate in the manner described over existing network and Internet infrastructure so that such infrastructure need not be modified to support the inventive system, method, or computer programs. It will also be appreciated that different portions of the existing Internet or world wide web infrastructure support different data rates, have different bandwidths, different signal characteristics, and may support different performance levels.

Where very high bandwidth and availability network connections are provided, even the cached prefix may be eliminated, though in other embodiments a shorter prefix may be stored.

This type of operation may generally be referred to a virtualization of the network and storage in part because the high-capacity storage associated with the source origin server is a sort of virtual storage for each of the edge servers. It will be appreciated that a single network may support both local storage at the edge servers where sufficiently high-bandwidth and high-availability network connections are not supported and virtualization where they are available.

It will be appreciated by those workers having ordinary skill in light of this description that the inventive system and method distribute the metadata to a plurality of locations (e.g to the origin server and edge servers, or to the origin server, edge servers, and directory servers: this is the control plane; distribute content to a plurality of locations, using information embodied in the control plane, but the actual path of the distribution may be different from the data path. Extensive use of metadata separate from the actual content not only enables cost-efficient system operation, but also the implementation of business functions related to the actual use of content. This differs from known conventional systems and methods which provide merely a single non-distributed directory and provide either no metadata or metadata at only a single location.

An embodiment of the request response and playback procedure 300 is now described. A user submits an implicit or explicit request (Step 301) for a content item (such as for a video V) to a web site, portal, or other network access point. This user is referred to as the user, user requestor, or simply as the requestor. An entity within the network receives the request and if this receiving entity is not an edge server, forwards it to an edge server. We assume for purposes of description that the edge server receives the request directly from the user and ignores any other intermediaries, service providers, routers, or the like that may actually be interposed between the requestor and the edge server.

The edge server receives the user request for video V (Step 302) and determines whether its local directory includes a directory entry for video V (Step 304). In one embodiment, the local directory stores entries indicating the availability of the content, the rights to the content, and the like. When a user selects a video title displayed on his computer, TV set via a set-top box, or other information appliance or access method, the user essentially transmits a URL or other globally unique identification for the video (or other content item) to the network. Intelligence embodied in the network (such as proximity of the user to an edge server near his/her geographic area) directs the request to that server. The edge server receiving the request examines its directory to determine if the metadata for the video V is in its directory (Step 304). If the metadata is located, it will indicate whether the video V is completely stored on the edge server storage, whether video V is currently cached inside the computer's main memory or other storage, or whether video V is only partially available (for example, the video prefix only). If only the metadata for video V is available, it will indicate where in the network copies of video V may be available (either at video V's origin server or on other edge servers that have fetched video V and are willing to serve it to our particular edge server). If it is determined that the metadata for video V is not in the receiving edge server's directory, an optional query is made to an external directory or directories for the selected video V (Step 312). These external directories may for example be selected from one or more of edge servers themselves or may be independent directories created for the purpose of making locating the videos easier (such as the Domain Name Service implementing Internet host name resolutions), among others.

If the metadata information relative to optimal location of video V is in one of the directories, then a source location for the video V is identified (Step 320) as described in greater detail below. If it is not available, then the query fails (Step 316) with optional but desirable notification to the user.

If it is determined that the video V is in the receiving edge server's directory, a further but optional determination may be made to determine if the requesting user or a group of users having one or more characteristics in common with the requesting user should be allowed to access the video V (Step 306). This optional test may pertain to the user having paid an access fee, accessing or not accessing from a particular geographic region associated with the users point of entry to the network, rights management in general, or any other rule, policy, criteria, list, event driven or other access or permission basis. If the user is not permitted access the request fails (Step 307) and the user is desirably informed either that the requested video is not available or that the user does not have the right permission to receive the video. If this optional test (Step 306) is not performed in a particular embodiment then instead, if it is determined by a process executing in the edge server that the video V is in the receiving edge server's directory, a further determination may be made as to whether the entire video V is in the edge server's (my) local cache or storage (Step 308).

If it is in the edge server's local cache then the edge server starts playback of the requested video V to the requesting user (Step 310). Optionally, though advantageously, the system or component thereof such as the edge server that will playback the video V will verify availability of network resources between the edge server and the requesting user and/or reserve such network resources (Step 309) so that delivery or playback to the user may be accomplished according to any established playback minimum requirements of quality of service requirements. Embodiments of the inventive system and method may further make a determination as to whether a required quality of service (QOS) requirement can be met by the available network resources (and further optionally by the quality and format of the video V itself) and when such QOS can be met permitting playback and when such QOS cannot be met not allowing playback (Step 312). This restriction on playback may for example, be placed by the owner of the video V, the distributor of V (such as for example an advertiser), so that the intended quality and presentation effect of the video message may be maintained.

On the other hand, if the determination as to whether video V is in the edge server's cache (Step 308) indicates that it is not in the cache, then an alternative source location for video V is made by querying the metadata stored locally on the edge server (Step 320). Advantageously, this identification of a source location from which to obtain the requested video V is made in an intelligent manner such as by determining the optimal source location considering network closeness of the video V, cost to move the video V from the possible source locations to the edge server making the query, and available paths and bandwidth over those paths, and the like factors. The analytical process involved in the source identification and selection may be performed locally on the edge server using the stored metadata, or may utilize an external process using the locally stored metadata, or metadata distributed to and stored on that external process server, or within the origin server using metadata stored there. In a preferred embodiment, the selection is made locally within the edge server using current metadata stored therein and optionally but advantageously using other information or data indicative of network resource availability and performance and usage costs.

In embodiments of the invention that provide separate directory server functionality, finding the optimal source location for the requested video V may be made utilizing a separate directory server that receives metadata updates from the system.

Once a source location (and optionally an "optimum" location given the set of possible locations) for the video V has been identified (Step 320) a determination as to whether network resources are available to deliver the video from the identified source server and the requesting edge server is made (Step 322). These resources are then reserved (Step 326). If it is determined that adequate resources are not available and cannot be reserved within a predetermined (or otherwise determined) acceptable period of time, either the request fails (Step 324) and notification of such failure is communicated to the requestor or preferably, an additional determination is made to identify a new source (Step 320). In practice, the determination as to whether resources are available (Step 322) may be part of the step of finding a source location (Step 320) or a separate step. Advantageously, it is combined so that identifying the best or optimal source location takes into account the available network resources, and the quality of service of the available network resources. In other embodiments, performing this as a separate or even as an additional check may be desirable where network resource availability may change rapidly so that the check would be made just prior to initiating a pull of the video V from the identified source location back to the requesting edge server (Step 328).

In yet another alternative embodiment, the step of finding a source location for the video content may provide for finding a plurality of source locations (optionally ranked in order of preference as the primary source) so that in the event that network resources for the preferred or optimal source are not available, one or more alternative sources have already been determined, and network resource availability for the alternative source locations can be immediately determined in succession without repeating the finding step. This may be of particular benefit under dynamic network conditions.

Once the source location has been identified and network resource availability verified, the edge server begins pulling the video V content from the identified source destination (Step 328). Because it will take some period of time for all of the video to be communicated from the source to the edge server, once the process has begun, a determination is made as to whether there is a sufficient amount of the requested video V so that playback to the requesting user may be initiated and maintained according to an acceptable manner.

The acceptability criteria may be established in a variety of ways, but for example may be set so that there are no discontinuities in playback, maintenance of predetermined playback rate, providing set QOS, or otherwise establish to maintain desired video quality. In general, the amount of video required to have been pulled may depend on the nature, quality, and availability of the network resources between the sending source server and receiving edge server. Typically, a greater amount of received video is required for poorer intervening network resources than for better intervening network resources.

When it is determined that sufficient video content has been received (Step 330) playback may begin to the requesting user from the edge server (Step 310). The edge server however, continues to pull or otherwise acquire video content from the identified source until all of the video V content has been received and stored local to the edge server.

In one embodiment of the invention, the edge server is able to receive different portions of the video V from alternative source locations and assemble them at the edge server for uninterrupted playback to the requesting user. This optional feature, may for example, be utilized when the video V is particularly long and where the source or elements of the network resources become unavailable during the transmission, such as in the event of a failure. In yet another embodiment, the source and network routing may be modified so as to reduce total cost of delivering the selected video V to the requestor. For example, under this optional operating procedure, in the event that only an expensive or slow network path were available at the time the initial transfer needed to begin, but a later cheaper or faster path became available at a later time during the transmission, the source and/or delivery path may be dynamically changed to take advantage of changed source server and/or network resource conditions.

Once the full video V has been received by the edge server, the metadata within the edge server is updated to identify that the full video V is now cached within the edge server (Step 332). Optionally, but desirably, the metadata in other of the edge servers is updated either at the same time, or as part of a scheduled update (Step 324). The changed metadata is also desirably communicated to the origin server for storage there, and to the extent that the origin server is responsible for administering metadata throughout the system, for subsequent communication to and storage by the other edge servers. In embodiments of the invention that provide a directory server, the modified metadata (or an indication of the particular change in the metadata) is communicated to and stored in the directory server.

It will be appreciated that the above procedure has been described for embodiments of the inventive system and method that do not utilize the optional content prefix caching, for example video prefix caching. When such video prefix caching is provided, each of the edge servers will have stored an initial playback portion of the video V and can begin playback at an earlier time and without waiting for a sufficient portion of the video content to be pulled from the source location. In these embodiments, playback may begin as soon after the video V has been identified and without waiting for sufficient video V to be pulled from the source. The precise point in time may generally depend upon the amount or length of prefix that is cached in the edge sever and the anticipated time required to locate an available source for the full video, reserve network resources between that identified source, and communicate the video V to the destination edge server. In one embodiment, the objective is to delay playback for only a short time (if at all) so that before the cached video prefix has been completely played or exhausted, sufficient video will have been received from the source to support continued interrupted play. Deterministic or statistical models may be used to tune the system, method, and procedures to accomplish this objective.

Other embodiments described herein pertain to models in which video content is not locally stored at the edge servers, or in which only a prefix portion of the video content is stored in the edge servers, and the system and method rely on post-request communication over high bandwidth and high-availability network resources. In these embodiments, the above described procedure 300 may be modified such that queries are not needed relative to the presence of the video V in any particular location as the location will be known, but in some situations placing a greater emphasis on identifying network resources to support the virtualization and access to remote storage over high-capacity connections.

Having described numerous embodiments of the invention, it may be noted that much of the description has focused on a particular type of content, that is video content, and more specifically video movies or other video content that is relatively large and for which playback requires maintaining a time synchronization or isochronous delivery between different segments of the content. It will be noted that this is a different type of content than traditional web pages which are neither large nor require isochronous delivery. The invention is not limited only to videos and it will be appreciated that the inventive system and method may be applied to other content types existent now or developed in the future for which isochronous playback or delivery and large file size are issues.

Having disclosed exemplary embodiments and the best mode, modifications and variations may be made to the disclosed embodiments while remaining within the scope of the present invention as defined by the following claims.

What is claimed is:

1. A metadata enabled edge server for distributing a content object to a user over a network communication link in response to a user request, said metadata enabled edge server comprising:
   a server computer having a processor and memory coupled to said processor for executing computer program instructions, and at least one input/output port for receiving and sending communications from external entities;
   a local storage device coupled to said server and locally storing metadata describing content objects accessible to said server including at least one location from where a particular one of said content object is stored and may be directed to said user; and
   a local controller for distributing said content object to said user using said metadata and maintaining isochronous delivery of portions of said content over said network.

2. A metadata enabled edge server as in claim 1, wherein said controller includes a request response and playback procedure executing as software on said metadata enabled edge server.

3. A metadata enabled edge server as in claim 1, wherein said network comprises the Internet.

4. A metadata enabled edge server as in claim 1, wherein said network communication link comprises a packet switched communication link not in itself having means for maintaining isochronous delivery of a content item separated into a plurality of packets for communication from said server to said requesting user.

5. A metadata enabled edge server as in claim 1, wherein said content items are internally accessible to said server computer.

6. A metadata enabled edge server as in claim 1, wherein said content items are externally accessible to said server computer.

7. A metadata enabled edge server as in claim 1, wherein said metadata database stores data selected from the set of content physical properties, content storage locations, content usage terms, content usage rights, content playback duration, content prefix cache status, content network routing cost information, and combinations thereof.

8. A metadata enabled edge server as in claim 1, wherein metadata also includes a prefix portion of the content or a low-resolution preview of the content.

9. A metadata enabled edge server as in claim 1, wherein said control means includes a request response and playback procedure.

10. A metadata enabled edge server as in claim 1, wherein said storage stores at least one content item that is intended to be rendered for presentation at a predetermined time rate.

11. A metadata enabled edge server as in claim 1, wherein said at least one content item comprises a video content item having image element frames and audio elements that is intended to be rendered for presentation on a playback device at said predetermined time rate so as to provide substantially the same visual and audio rendering to a viewer a when generated.

12. A metadata enabled edge server as in claim 11, wherein the amount of data comprising said video content item is greater than the amount of data that is communicated in a packet over a packet switched Internet network.

13. A metadata enabled edge server as in claim 1, wherein the amount of data comprising said video content item is an amount of video content that when rendered in real-time at an intended playback rate would exceed a fraction of time of broadcast quality video.

14. A metadata enabled edge server as in claim 1, wherein said video content item comprises substantially a fill-length feature film in a video format.

15. A metadata enabled edge server as in claim 1, wherein said network communication link comprises Internet infrastructure.

16. A metadata enabled edge server as in claim 1, wherein said network communication link comprises Internet infrastructure and Internet communication protocol.

17. A metadata enabled edge server as in claim 1, wherein said metadata is used to enables intelligent decisions to be made on system operation and content routing.

18. A metadata enabled edge server as in claim 1, wherein said metadata contains information about the actual content including its physical properties, possible locations of the content represented by the metadata, its usage terms.

19. A metadata enabled edge server as in claim 1, wherein said metadata includes a globally unique identifier describing the content object and at least one location at which said content object may be found.

20. A metadata enabled edge server as in claim 1, wherein said content object comprises a video content object having an amount of data requiring a plurality of packets for communication over a packet switched network, and said controller providing isochronous delivery from said identified content location to a playback device of said requesting user.

21. A system for distributing a content object to a user over a network communication link in response to a user request, said system comprising:

a an origin server; a plurality of edge servers each coupleable to said origin server over a communications network; each said edge server being a metadata enabled edge server including:

a server computer having a processor and memory coupled to said processor for executing computer program instructions, and at least one input/output port for receiving and sending communications from external entities;

a local storage device coupled to said server and locally storing metadata describing content objects accessible to said server including at least one location from where a particular one of said content object is stored and may be directed to said user; and a local controller for distributing said content object to said user using said metadata and maintaining isochronous delivery of portions of said content over said network.

* * * * *